United States Patent
Yamaji et al.

(10) Patent No.: US 6,367,207 B1
(45) Date of Patent: Apr. 9, 2002

(54) FRICTION RESISTANCE GENERATOR

(75) Inventors: Ippei Yamaji, Tokyo; Kenji Mimura, Kanagawa, both of (JP)

(73) Assignee: Gaea Tech Corporation, Osaka (JP)

( * ) Notice: Subject to any disclaimer, the term of this patent is extended or adjusted under 35 U.S.C. 154(b) by 0 days.

(21) Appl. No.: 09/472,851

(22) Filed: Dec. 28, 1999

(30) Foreign Application Priority Data

Dec. 28, 1998 (JP) .......................................... 10-372599
Mar. 18, 1999 (JP) .......................................... 11-073624

(51) Int. Cl.$^7$ .................. F16D 41/064; F16F 15/00; F16H 135/12
(52) U.S. Cl. .................. 52/167.6; 52/167.2; 192/45; 248/550; 248/638; 188/83
(58) Field of Search .................. 52/167.4, 167.5, 52/167.6, 167.2; 248/550, 638; 192/45, 38; 188/82, 84, 83

(56) References Cited

U.S. PATENT DOCUMENTS

| | | | | |
|---|---|---|---|---|
| 3,034,365 A | * | 5/1962 | Stieber | |
| 3,557,921 A | * | 1/1971 | Takada | 192/45 |
| 5,035,309 A | * | 7/1991 | Takada | 192/45 |
| 5,176,232 A | * | 1/1993 | Malecha | 192/45 |
| 5,328,012 A | * | 7/1994 | Takata | 192/45 |
| 5,720,371 A | * | 2/1998 | Kimura | 192/444 |
| 6,089,363 A | * | 7/2000 | Mimura | 192/45 |
| 6,148,978 A | * | 11/2000 | Mimura | 192/45 |

FOREIGN PATENT DOCUMENTS

| | | |
|---|---|---|
| EP | 0 884 496 A1 | 12/1998 |
| JP | 2733200 | 3/1996 |
| JP | 2801153 | 5/1996 |
| JP | 9-256673 | 9/1997 |

* cited by examiner

*Primary Examiner*—Robert Canfield
(74) *Attorney, Agent, or Firm*—Lowe Hauptman; Gilman & Berner, LLP

(57) ABSTRACT

The present invention relates to a friction resistance generator capable of always generating a stable frictional force even if the opposed surfaces of a rotary member and a passive member have a curved shape such as a circumferential surface or a spherical surface. In the present invention, when the rotary member is rotated in the predetermined direction while a load is applied to the passive member, the rollers supported rotatably on one of the rotary member and the passive member rotate while being in contact with the rotary member or the passive member, thereby generating a frictional force according to the load on the rollers. In this case, the rollers are installed rotatably on either one of the opposed surfaces of the rotary member and the passive member, and the rollers are arranged so as to be capable of coming into contact with the other of the opposed surfaces of the rotary member and the passive member. Therefore, the rollers can be formed so as to rotate while being in contact with only either one of the rotary member and the passive member, so that the present invention can be applied to the apparatus in which the opposed surfaces of the rotary member and the passive member have a curved shape such as a circumferential surface or a spherical surface.

17 Claims, 8 Drawing Sheets

(a)

FRICTION RESISTANCE GENERATOR

BACKGROUND OF THE INVENTION

1. Field of the Invention

The present invention relates to a friction resistance generator which is used as a mechanism for providing the rotational motion of various types of machines with an arbitrary resistance due to a frictional force.

2. Description of the Related Art

Generally, bearings known as one of machine elements are broadly classified into sliding bearings for supporting a member on the shaft side via a lubricating oil and rolling bearings for supporting a member on the shaft side via balls or rollers. For all of these bearings, the frictional resistance between the members is minimized because the object thereof is to allow the member on the shaft side to always move smoothly. Because the bearing is not intended to control the power by providing the moving member with a resistance, a damping device such as a shock absorber or a damper is provided additionally when it is desired to control the rotational speed to be constant as in case of an automatic door closing mechanism.

Also, mechanisms such as a clutch, a torque limiter, or a brake are known as a mechanism for generating sliding friction between two rotating members. The object of these mechanisms is not only to completely stick with pressure the members but also to transmit power while producing a difference in rotation according to the load between the members by utilizing the sliding friction.

The sliding bearing described above can be operated with a very low frictional resistance equivalent to that of the rolling bearing if the lubricating oil is interposed between the members in an ideal state. However, it is very difficult to supply a lubricating oil always in an ideal state. Therefore, the sliding bearing has a disadvantage that two sliding surfaces sometimes come into direct contact with each other, thereby remarkably increasing the frictional force. Also, for a rotating mechanism using a bearing, the only method for controlling the rotational speed to be constant is to additionally provide an expensive damping device, which leads to a problem in that the cost increases and the construction becomes complicated and large.

Further, for a mechanism for transmitting power by utilizing sliding friction as in case of a clutch, it is very difficult to control a frictional force in a semi-contact state to be constant. Especially when one member rotates at a lower speed with respect to the other member, a problem occurs in that a so-called stick slip easily occurs, in which static friction and dynamic friction act intermittently on the two sliding surfaces, whereby the frictional force becomes extremely unstable.

Thereupon, the inventor of the present invention has already proposed a friction resistance generator which can control the speed of rotating motion of an object to be constant without additionally providing a special mechanism, can carry out the control easily, and can always generate a stable frictional force, the apparatus having been disclosed in Japanese Patent Nos. 2733200 and 2801153.

The invention disclosed in Japanese Patent No. 2801153 provides a rolling friction apparatus comprising a rotary member rotating around the axis, a number of rollers arranged along the rotation path of the rotary member, a passive member facing the rotary member in the radial direction with the rollers interposed therebetween, and a cage for rotatably holding the rollers at intervals, wherein the opposed surfaces of the rotary member and the passive member are formed so as to be parallel with the rotation axis of the rotary member, and the rolling axis of each of the rollers is inclined so as to make a predetermined angle with respect to a cross section including the rotation axis of the rotary member. Specifically, in this rolling friction apparatus, at least one of the rotary member and the passive member is pressed by applying an arbitrary load onto the roller side and the rotary member is rotated, by which the rollers are rolled while being accompanied with sliding friction, so that a stable frictional force can be generated.

However, in the rolling friction apparatus, the opposed surfaces of the rotary member and the passive member must be flat surfaces parallel to each other or surfaces having a symmetrical shape because the inclined rollers roll while being in contact with the opposed surfaces of the rotary member and the passive member. Therefore, when the rotary member and the passive member are formed by a cylindrical or spherical member opposing in the radial direction, the rollers cannot be brought into uniform contact with the surfaces of both the rotary member and the passive member, so that there remains a problem in that it is difficult to apply this invention to the apparatus using the rotary member and the passive member having the opposed surfaces of such a curved shape.

SUMMARY OF THE INVENTION

The present invention has been made to solve the above problems, and accordingly an object thereof is to provide a friction resistance generator capable of always generating a stable frictional force even if the opposed surfaces of a rotary member and a passive member have a curved shape such as a circumferential surface or a spherical surface.

The present invention provides a friction resistance generator comprising a rotary member rotatable in a predetermined direction, a passive member arranged so as to be opposed to a predetermined surface of the rotary member, and a number of rollers arranged at intervals in a predetermined direction between the opposed surfaces of the rotary member and the passive member, the rotation axis of each of the rollers being inclined at a predetermined angle with respect to the rotation direction of the rotary member, wherein the opposed surfaces of the rotary member and the passive member are formed into a predetermined curved shape, the rollers are installed rotatably on either one of the opposed surfaces of the rotary member and the passive members, and the rollers are arranged so as to be contactable with the other of the opposed surfaces of the rotary member and the passive member.

Thereupon, when the rotary member is rotated in the predetermined direction while a load is applied to the passive member, the rollers supported rotatably on one of the rotary member and the passive member rotate while being in contact with the rotary member or the passive member. In this case, even if the opposed surfaces of a rotary member and a passive member have a curved shape such as a circumferential surface or a spherical surface, the rollers can be formed so as to rotate while being in contact with only either one of the rotary member and the passive member. Also, since the roller is rotatably supported on the rotary member or the passive member, the roller rotates while rolling motion thereof in a direction inclined at a predetermined angle with respect to the rotation direction of the rotary member is regulated. Thereby, a frictional force according to the load is generated between the roller and the rotary member or the passive member. At this time, the roller produces sliding friction while rotating, so that less static friction is produced even at the time of low-speed rotation, whereby a stable resisting force can always be provided.

Also, in the above configuration, the rotary member and the passive member are formed into a cylindrical shape, and are arranged coaxially with each other, a plurality of roller trains are provided in the axial direction of the rotary member, and the rotary member is movably provided in the axial direction so that only an arbitrary roller train comes into contact with the rotary member or the passive member. Thereby, an arbitrary frictional force can be provided depending on the axial position of the rotary member.

Further, the opposed surfaces of the rotary member and the passive member are formed into a spherical shape, and the rotary member and the passive member are concentrically arranged. Also, the rotary member is rotatably connected to a foundation structure of an arbitrary building, and the passive member is fixed to the ground. Thereby, the apparatus can be caused to function as a seismic isolation device for a building.

DESCRIPTION OF THE PREFERRED EMBODIMENTS

FIGS. 1 to 8 show a first embodiment of the present invention, which is configured so that a friction resistance generator in accordance with the present invention can be applied to a rotary brake.

Figure 1:
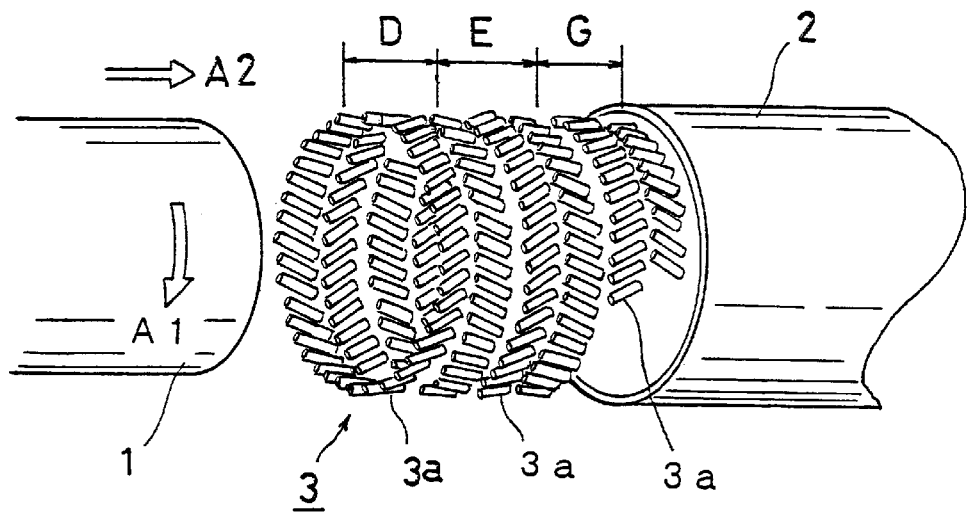
FIG. 1 is an exploded perspective view of a friction resistance generator in accordance with a first embodiment of the present invention.
Figure 2:
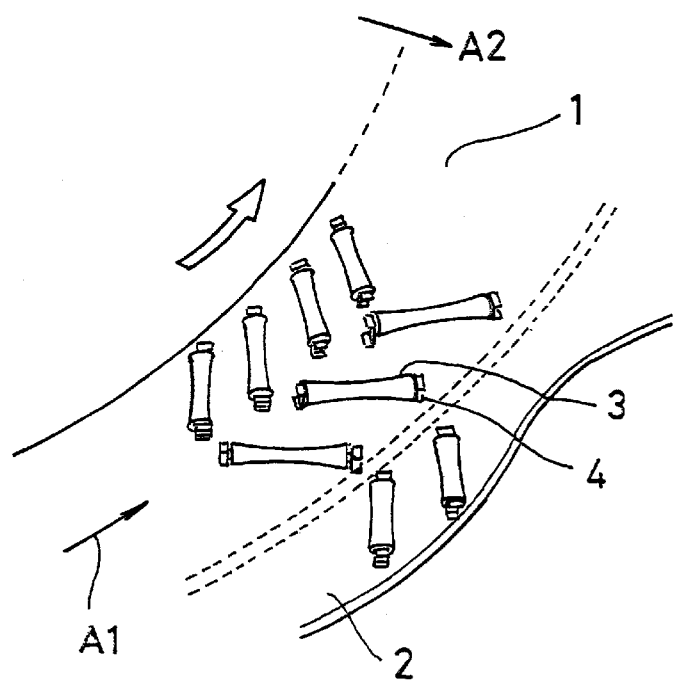
FIG. 2 is a partial perspective view of the friction resistance generator.
Figure 3:
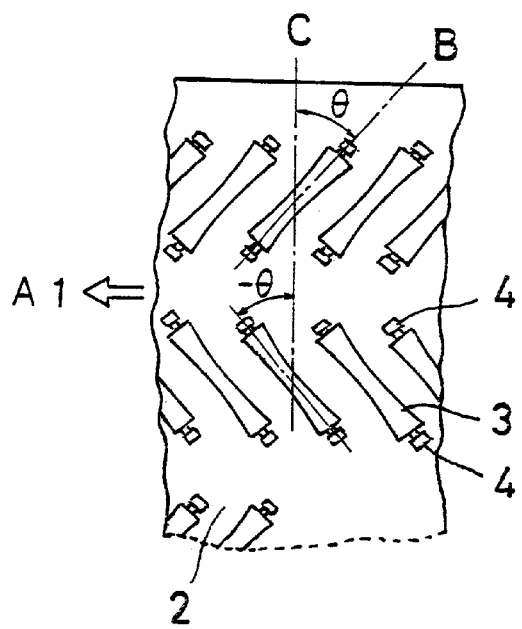
FIG. 3 is a plan view of an essential portion of the friction resistance generator.

The friction resistance generator comprises a cylindrical rotary member 1 which rotates in the rotation direction of A1, a passive member 2 which is opposed to the outer peripheral surface of the rotary member 1, and a number of rollers 3 arranged along the rotation path A1 of the rotary member 1. The rollers 3 form plural roller trains. Each of the rollers 3 is rotatably supported on the inner peripheral surface of the passive member 2 by a support member 4. In FIG. 1, the rotary member 1, the passive member 2, and the rollers 3 are shown so as to be separated in the axial direction for convenience of explanation. Actually, however, the rotary member 1 and the passive member 2 are opposed to each other in the radial direction, and the rollers 3 are arranged between the opposed surfaces of the rotary member 1 and the passive member 2.

Each of the rollers 3 has a columnar shape extending in the axial direction, and is formed so that the diameter thereof decreases gradually in the axial direction from both of the ends to the middle. Specifically, the rollers 3 are formed so as to come into line contact with the outer peripheral surface of the rotary member 1, and are arranged at equal intervals in the circumferential direction of the rotary member 1. In this case, the support member 4 for supporting both ends of the roller 3 comprises a member of low friction such as a bearing.

Also, the friction resistance generator is provided with a plurality of roller train groups 3a comprising paired roller trains, in which the rollers 3 are inclined in the opposite direction to each other, in the axial direction of the rotary member 1. In this case, in each roller train group 3a, the rollers 3 are arranged so that the rotation axis B of the roller 3 is inclined at an angle of θ (or −θ) whose absolute value is equal with respect to the cross section C perpendicular to the rotation direction of the rotary member 1.

Figure 4:
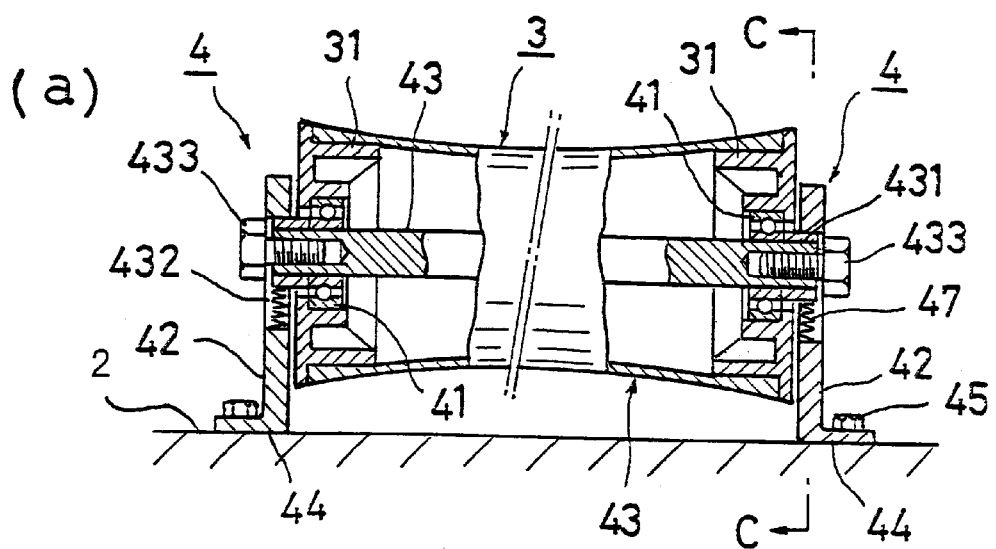
FIG. 4 is a side sectional view of a roller and a support member therefor.

The support member 4 comprises a pair of bearings 41 installed at both end portions 31 of the roller 3, a pair of support frames 42 arranged at both sides of the roller 3, and a shaft 43 both ends of which are supported on the support frames 42 as shown in FIG. 4. The roller 3 is installed rotatably to the shaft 43 via the bearings 41. A leg portion 44 of each of the support frames 42 is fixed to the passive member 2 by means of a bolt 45.

Figure 5:
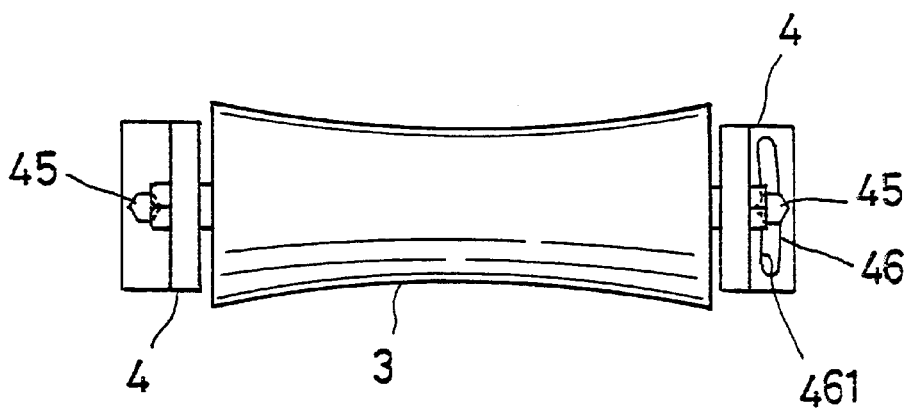
FIG. 5 is a plan view of a roller and a support member therefor.

Also, as shown in FIG. 5, one of the leg portions 44 is provided with an angle adjusting mechanism 46 comprising an arcuatee elongated hole 461 so that the inclination angle θ (or −θ) of the rotation axis of the roller 3 can be arbitrarily adjusted by loosening the bolt 45.

Figure 6:
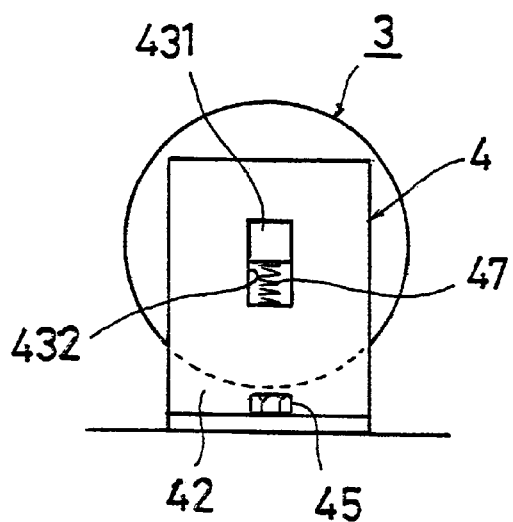
FIG. 6 is a side view of a roller and a support member therefor.

Further, as shown in FIG. 6, an end portion 431 of the shaft 43 is formed into a square shape in cross section, and is fitted in an elongated hole 432 formed in the support frame 42 so as to be movable vertically. Also, a spring 47 for pressing the shaft 43 upward is provided in the elongated hole 432, so that the roller 3 is urged against the passive member 2 by the spring 47. Further, a bolt 433 is installed at each of the end portions 431 of the shaft 43, so that the axial movement of the shaft 43 is regulated the bolts 433.

Figure 7:
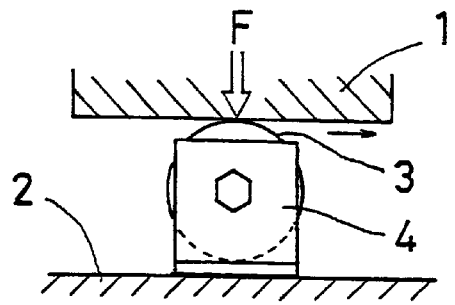
FIG. 7 is a side view of an essential portion showing the operation of the friction resistance generator.
Figure 8:
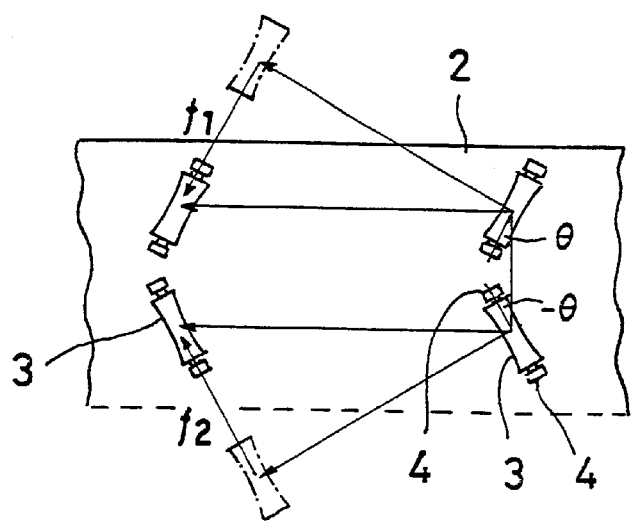
FIG. 8 is a plan view of an essential portion showing the operation of the friction resistance generator.

In the friction resistance generator configured as described above, when the rotary member 1 is rotated in the direction of A1 while a load F is applied to the passive member 2 as shown in FIG. 7, the rollers 3 rotate while being in contact with the rotary member 1. At this time, the roller 3 rotates while the rolling motion thereof in the direction inclined at the angle of θ (or −θ) is regulated as shown in FIG. 8. Therefore, a frictional force according to the load F in the axial direction B is produced between the roller 3 and the rotary member 1. At this time, the roller 3 produces sliding friction while rotating, so that less static friction is produced even at the time of low-speed rotation, whereby a stable resisting force can always be provided. In this case, even if static friction is produced at an early stage, it is transferred to dynamic friction momentarily by the rotation of the roller 3. Also, if the load of the rotary member 1 is released, a state in which no frictional force is produced can be obtained.

Thus, according to the friction resistance generator of this embodiment, the rotation axis B of the roller 3 is inclined at the predetermined angle of θ (or −θ) with respect to the cross section C perpendicular to the rotation direction A1 of the rotary member 1, by which sliding friction is produced while the roller 3 is rotated. Therefore, in the rotating motion of the rotary member 1, an arbitrary resisting force proportional to the load on the passive member 2 can be obtained. Moreover, by changing this load, the resisting force of the rotary member 1 can be controlled very easily. At this time, since the sliding friction entails the rotation of the roller 3, static friction, which causes the stick slip, can be made far less, so that a stable frictional resistance can always be obtained. Therefore, the friction resistance generator can be applied to a rotary brake or the like very advantageously.

Also, according to this embodiment, since the roller 3 is rotatably installed to the passive member 2 via the support member 4, the roller 3 can be formed so as to rotate while being in contact with the rotary member 1 only, so that this embodiment can be applied to the apparatus such that the opposed surfaces of the rotary member 1 and the passive member 2 have a curved shape. Although the embodiment in which the rollers 3 are installed on the inner peripheral surface of the passive member 2 has been shown above, the configuration may be such that for example, the rotary member is formed by an outside cylinder, and the rollers are installed on the inside passive member. In this case, friction is produced between the rollers and the outside rotary member, so that the effect of cooling from the outside against the frictional heat caused by the rollers becomes excellent.

Further, the frictional force can be controlled by changing the angle θ, and also the braking force can be controlled by the diameter of the roller 3 and the surface material thereof.

Also, as shown in FIG. 8, the rollers 3 in each roller train produce frictional forces f1 and f2 which are approximately equal in the opposite direction to each other, but the axial forces of the rotary member 1 are canceled each other. As a result, the rotary member 1 rotates along the rotation path A1 without producing an axial positional shift. Specifically, the rotary member 1 is configured so that it is not moved in the axial direction by its own rotation, and can be moved in the axial direction only by any external force which displaces the rotary member 1 in the axial direction. In this case, the roller 3 attempts to roll toward the outside of the roller train, but the configuration may be such that the inclination angle θ (or −θ) of the roller 3 in each roller train is made opposite to the embodiment so that the roller 3 attempts to roll toward the inside of the roller train.

In the above-described embodiment, the rotary member 1 can be moved in the axial direction (direction A2 in FIG. 1). Specifically, when the rotary member 1 is moved from a position where it is in contact with the roller train group 3a in a region D to a position where it is in contact with the roller train groups 3a in regions D and E, the frictional resistance increases. Similarly, when the rotary member 1 is moved to a position where it is in contact with the roller train groups 3a in regions D, E and G, the frictional resistance increases further. Therefore, the magnitude of the frictional force can be controlled arbitrarily according to the movement distance of the rotary member 1 in the direction of arrow A2 without adjusting the angles of the rollers 3. When the frictional force is controlled, control means (not shown) for displacing the rotary member 1 in the axial direction is provided separately.

Figure 9:
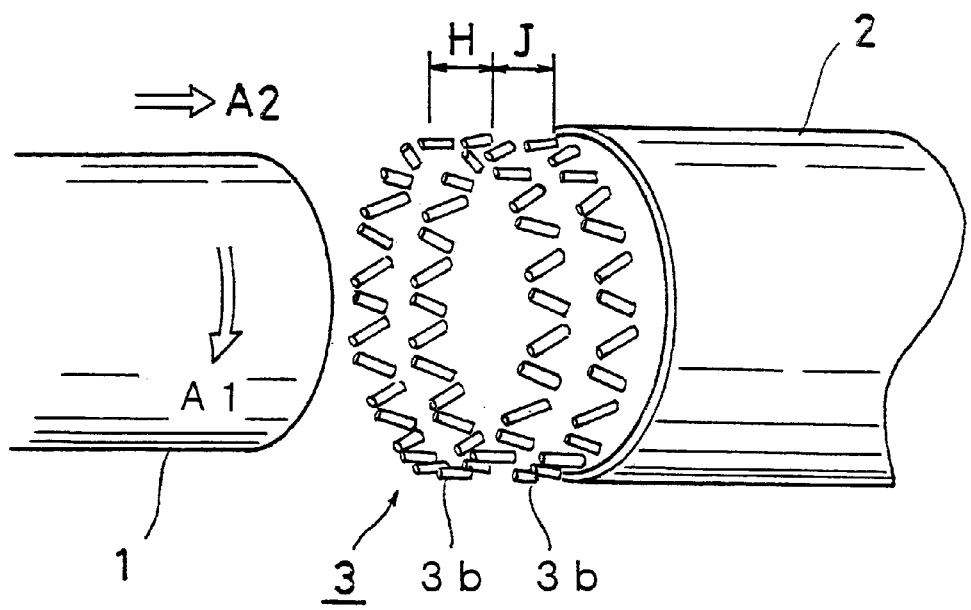
FIG. 9 is an exploded perspective view of a friction resistance generator in accordance with a second embodiment of the present invention.
Figure 10:
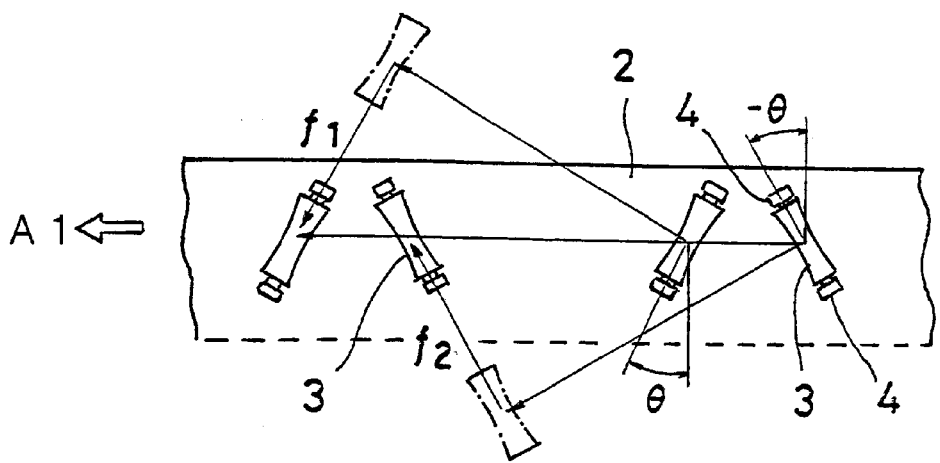
FIG. 10 is a plan view of an essential portion showing the operation of the friction resistance generator.

FIGS. 9 and 10 show a second embodiment of the present invention. This embodiment is the same as the first embodiment except for the arrangement of the rollers 3. Therefore, the duplicated explanation is omitted.

In the second embodiment, the rollers 3 are arranged so as to be inclined by repeating the angles θ and −θ alternately in the rotation direction A1 of the rotary member 1. Thereby, in one roller train 3b, the forces acting on one side and the other side in the axial direction of the rotary member 1 are uniformly produced as a whole. Therefore, the forces in the axial direction of the rotary member 1 can be canceled each other, so that the axial positional shift of the rotary member 1 is not produced by the own rotation of the rotary member 1. In this case, a plurality of roller trains 3b are provided in the axial direction of the rotary member 1, and the rotary member 1 is moved from a region H of the roller train 3b to a region J as in the case of the first embodiment, by which the magnitude of the frictional force can be controlled arbitrarily. Although the rollers 3 are arranged in the opposite direction alternately one by one in this embodiment, the rollers 3 may be arranged in the opposite direction alternately every several rollers.

Figure 11:
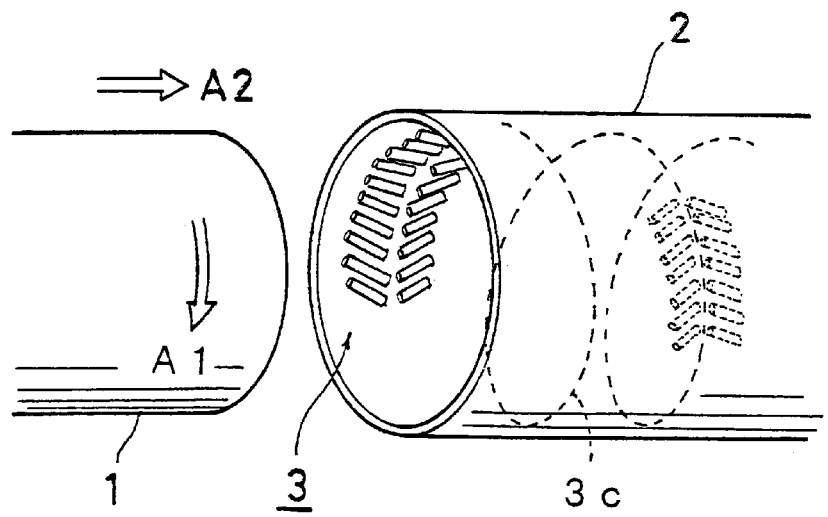
FIG. 11 is an exploded perspective view of a friction resistance generator in accordance with a third embodiment of the present invention.

FIG. 11 shows a third embodiment of the present invention. This embodiment is the same as the first embodiment except for the arrangement of the rollers 3. Therefore, the duplicated explanation is omitted.

In this third embodiment, the roller train group 3a arranged as in the case of the first embodiment is arranged continuously along a spiral path 3c around the axis of the rotary member 1. Thereupon, when the rotary member 1 is moved in the axial direction, the number of rollers 3 which are in contact with the rotary member 1 changes, by which the magnitude of the frictional force can be controlled arbitrarily. In this case, since the rollers 3 are arranged continuously in a spiral form in the axial direction of the rotary member 1, the magnitude of the frictional force can be controlled in a stepless manner. Also, in this embodiment, as in the case of the second embodiment, the rollers 3 can be arranged in the opposite direction alternately one by one.

Figure 12:
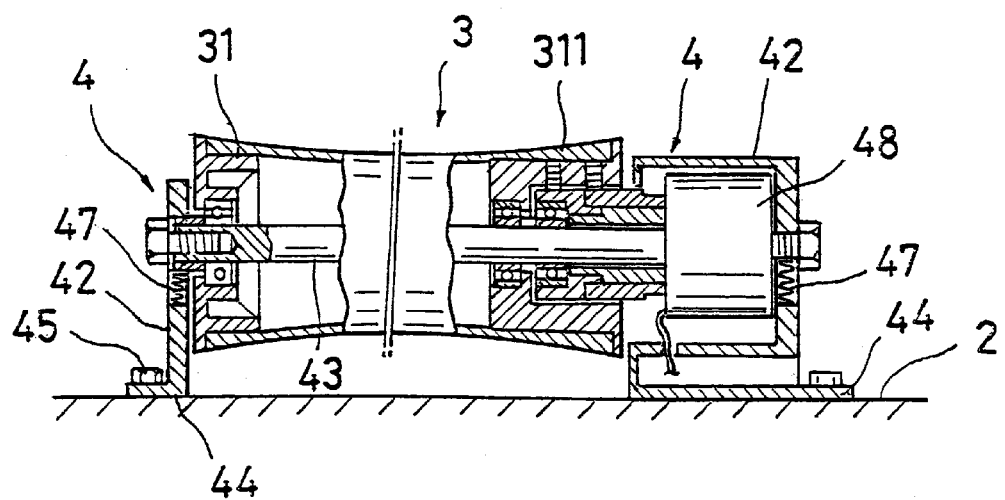
FIG. 12 is a side sectional view of a roller and a support member therefor in accordance with a fourth embodiment of the present invention.
Figure 13:
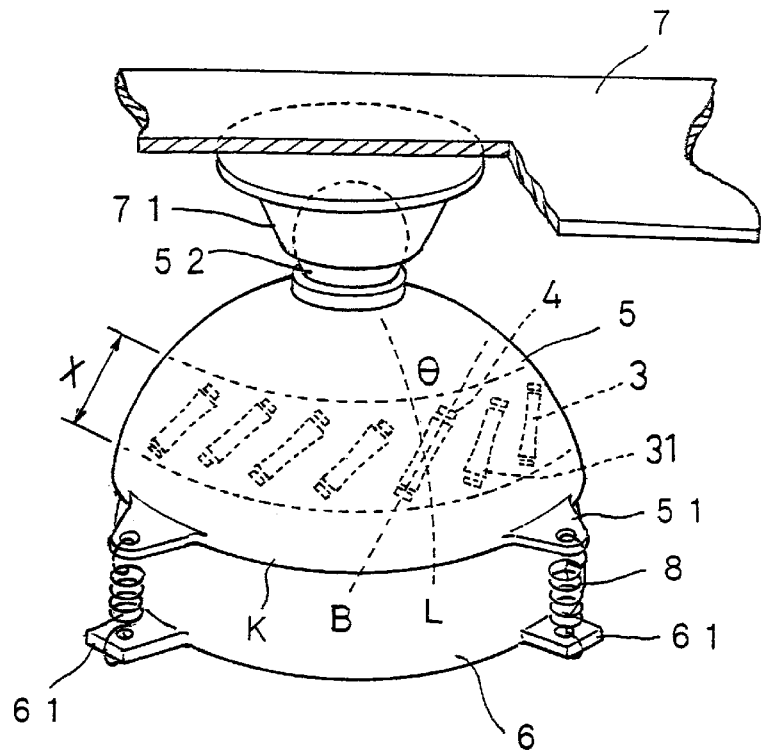
FIG. 13 is a perspective view of a seismic isolation device in accordance with a fifth embodiment of the present invention.
Figure 14:
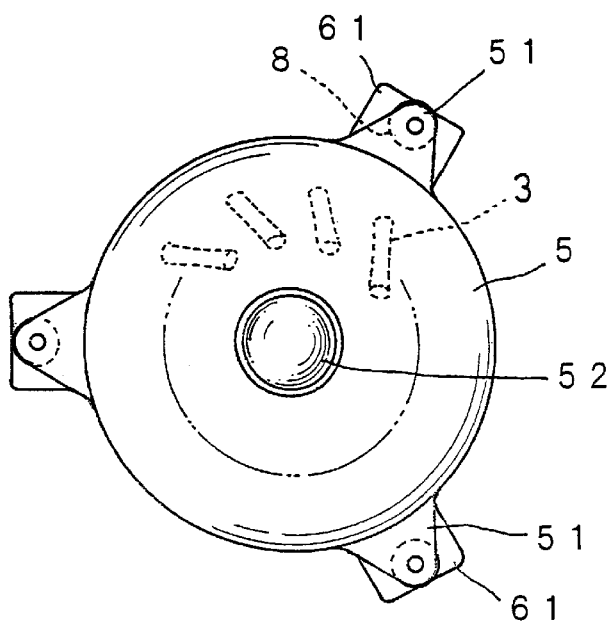
FIG. 14 is a plan view of the seismic isolation device.

FIG. 12 shows a fourth embodiment of the present invention, in which there is provided a generator 48 that is driven by the rotation of the roller 3. In this case, the generator 48 is provided on one of the support frames 42, and a rotating force is transmitted from one of end portions 311 of the roller 3 to the generator 48. Specifically, when the friction resistance generator of the present invention is used for a rotary brake, braking energy can be utilized effectively by the generator 48. For example, if the power of the generator 48 is stored in a battery, it can be utilized as a power source for the relating electronic devices. Also, since the load of the generator 48 is added to the rotation of the roller 3, the braking force can be enhanced.

Needless to say, the present invention is not limited to the above-described embodiments. The friction resistance generator of the present invention can be applied to not only the rotary brake mechanism but also various types of machines such as a clutch mechanism for a driving shaft of an automobile etc., an automatic closing apparatus for a door, a braking mechanism for an elevator, a shock absorbing mechanism for an automobile etc., and a braking mechanism for a seat belt.

FIGS. 13 to 16 show a fifth embodiment of the present invention, in which the friction resistance generator in accordance with the present invention is configured as a seismic isolation device for a building. In these figures, the same reference numerals are applied to essentially the same elements as those in the above-described embodiments.

The seismic isolation device of this embodiment comprises a rotary member 5 formed into a hemispherical shape and a substantially hemispherical passive member 6 opposed to the inner surface of the rotary member 5. A number of rollers 3, each of which is rotatably supported by a support member 4 that is the same as that in the above-described embodiments, are arranged between the rotary member 5 and the passive member 6. The rotary member 5 and the passive member 6 are arranged concentrically with each other with their convex sides facing upward.

The rotary member 5 has an inside diameter somewhat larger than the outside diameter of the passive member 6 so as to cover the passive member 6, and a plurality of protrusions 51 projecting to the outside are provided at intervals in the circumferential direction at the lower end part of the rotary member 5. At the top of the rotary member 5, a spherical connecting portion 52, which is connected to a structure 7 on the side of the building, is provided. The connecting portion 52 is rotatably fitted in a bearing 71 provided on the bottom surface of the structure 7. In this case, the connecting portion 52 may be disposed at any position that is convenient in terms of structure other than the top of the rotary member 5.

The passive member 6 is formed so as to be somewhat larger than a hemisphere, and is fixed to the ground on which the building is disposed. A plurality of protrusions 61 are provided at intervals in the circumferential direction at the lower end part of the passive member 6. The protrusion 61 is connected to the protrusion 51 of the rotary member 5 via a spring 8. Specifically, the springs 8 configure rotation regulating means for elastically regulating the rotation of the rotary member 5.

The roller 3 is installed on the inside surface of the rotary member 5 via the support member 4. When the equator line K along the lower end of the rotary member 5 is assumed, the rollers 3 are arranged in a range X above the equator line K along the equator line K. In this case, the rotation axis B of the roller 3 is arranged so as to be inclined at an angle of θ (about 45°) with respect to a longitude line L of the rotary member 5. The roller 3 has a curved shape in which the middle portion is concave, so that it always comes into line contact with the spherical surface of the passive member 6.

Figure 15:
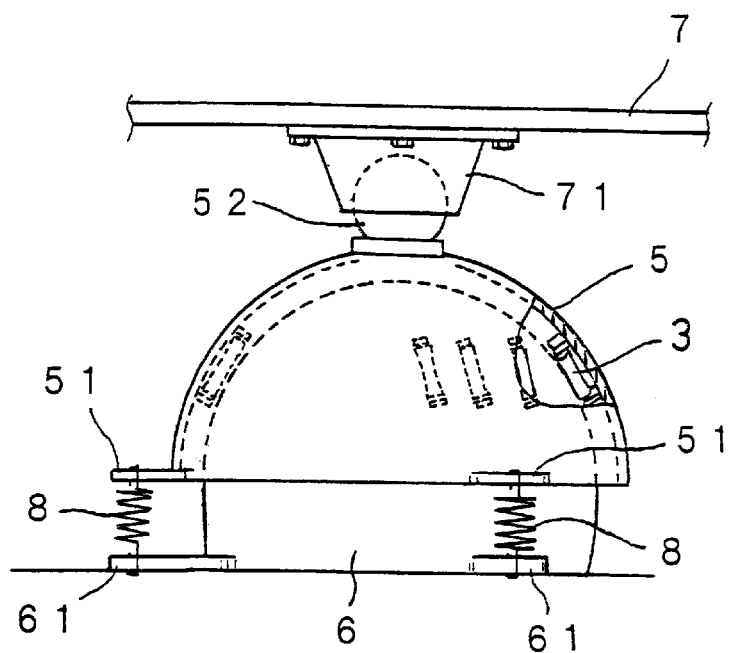
FIG. 15 is a side view of the seismic isolation device.
Figure 16:
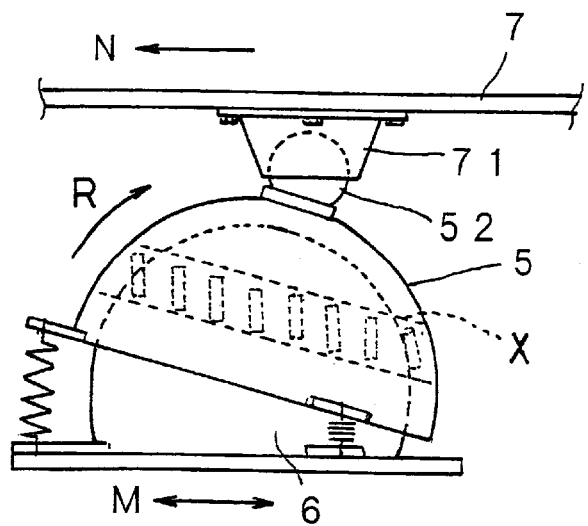
FIG. 16 is a side view showing the operation of the seismic isolation device.

In the seismic isolation device constructed as described above, the springs 8 are mutually balanced, and the position of the top of the rotary member 5 agrees with the top of the passive member 6 in the normal state, thereby the state shown in FIG. 15 being kept. If the system is subjected to a transverse swing caused by an earthquake or the like, the rotary member 5 turns in the direction R opposite to the transverse swing, and the passive member 6 is moved in the direction M together with the ground as shown in FIG. 16. At this time, the rotary member 5 is subjected to a frictional resistance (braking force) due to the rollers 3, so that the swing of the structure 7 in the direction N is damped by this frictional resistance. Also, since the movement range of the rotary member 5 is regulated by the springs 8, the rotary member 5 is not turned extremely, so that the rollers 3 are kept in a state in which they are always brought into contact effectively with the passive member 6.

Thus, according to the-seismic isolation device of this embodiment, static friction and dynamic friction do not act intermittently, so that seismic vibrations can be damped by the very stable braking force. Also, a complicated damping apparatus such as a shock absorber and a damper is not used, so that the construction can be simplified. Further, since the opposed surfaces of the rotary member 5 and the passive member 6 are formed into a spherical shape, the rotary member 5. can be moved in the three-dimensional direction, so that this system can accommodate transverse vibrations in all directions.

Since the rotary member 5 is formed so as to cover the passive member 6 and the rollers 3 from the upside, it has a dust-proof function, so that the system can be used even in severe conditions other than on the floor or in the room. In this case, the system is best suitable as a seismic isolation device for furniture and buildings because of its simple construction.

Although the configuration in which the rollers 3 each having a curved surface with the center being concave are provided on the side of the rotary member 5 is shown in the above-described embodiment, the rollers 3 each having a curved surface with the center being convex may be provided on the side of the passive member 6, and the rollers 3 may be brought into contact with the inside surface of the rotary member 5.

Also, although the plurality of springs 8 are used as the rotation regulating means in the above-described embodiment, the rotation regulating means may be configured by a damping apparatus such as a shock absorber or a damper.

Further, although the example in which the friction resistance generator in which the opposed surfaces of the rotary member 5 and the passive member 6 are formed into a spherical shape is used for a seismic isolation device is shown in the above-described embodiment, the apparatus can be applied to various types of machines as an articulated joint with braking function.

What is claimed is:

1. A friction resistance generator comprising:

a rotary member rotatable in a predetermined direction;

a passive member arranged so as to be opposed to a predetermined surface of the rotary member; and a number of rollers arranged at intervals in a predetermined direction between the opposed surfaces of the rotary member and the passive member, the rotation axis of each of the rollers being inclined at predetermined angle with respect to the rotation direction of the rotary member, wherein the opposed surfaces of the rotary member and the passive member are formed into a predetermined curved shape;

the rollers are installed rotatably by support members on either one of the opposed surfaces of the rotary member and the passive member; and the rollers are arranged so as to be contactable with the other of the opposed surfaces of the rotary member and the passive member.

2. The friction resistance generator according to claim 1, wherein the peripheral surface of the roller is formed along the curved shape of the surface contacting with the roller of the rotary member or the passive member.

3. The friction resistance generator according to claim 1, wherein the opposed surfaces of the rotary member and the passive member are formed into a circumferential surface shape.

4. The friction resistance generator according to claim 3, wherein the rotary member and the passive member are formed into a cylindrical shape and are arranged coaxially with each other, the rotary member is provided so as to be rotatable with the axis thereof being the center, and the rollers are arranged in the circumferential direction of the rotary member.

5. The friction resistance generator according to claim 4, wherein at least one pair of roller trains in which the rollers are inclined in the opposite direction to each other is provided.

6. The friction resistance generator according to claim 4, wherein at least one roller train in which the rollers are inclined alternately every a predetermined number is provided.

7. The friction resistance generator according to claim 4, wherein a plurality of roller trains are provided in the axial direction of the rotary member, and the rotary member is provided movably in the axial direction so that any roller train comes into contact with the rotary member or the passive member.

8. The friction resistance generator according to claim 4, wherein a roller train is arranged in a spiral form around the axis of the rotary member.

9. The friction resistance generator according to claim 8, wherein the rotary member is provided movably in the axial direction so that any roller comes into contact with the rotary member or the passive member.

10. A friction resistance generator comprising:

a rotary member rotatable in a predetermined direction;

a passive member arranged so as to be opposed to a predetermined surface of the rotary member; and a number of rollers arranged at intervals in a predetermined direction between the opposed surfaces of the rotary member and the passive member, the rotation axis of each of the rollers being inclined at predetermined angle with respect to the rotation direction of the rotary member, wherein the opposed surfaces of the rotary member and the passive member are formed into a predetermined curved shape;

the rollers are installed rotatably by support members on either one of the opposed surfaces of the rotary member and the passive member; and the rollers are arranged so as to be contactable with the other of the opposed surfaces of the rotary member and the passive member, wherein the opposed surfaces of the rotary member and the passive member are formed into a spherical shape.

11. The friction resistance generator according to claim 10, wherein the rotary member and the passive member are formed into a hemispherical shape and are arranged concentrically with each other, the rotary member is provided so as to be rotatable with the circle center thereof being the center, and the rollers are arranged in a predetermined circumferential direction along the spherical surface of the rotary member.

12. The friction resistance generator according to claim 11, wherein the apparatus is provided between a structure of an arbitrary building and the ground, the rotary member is connected rotatably to the structure of the building side, and the passive member is fixed onto the ground.

13. The friction resistance generator according to claim 12, wherein rotation regulating means for elastically regulating the rotation of the rotary member is provided.

14. The friction resistance generator according to claim 13, wherein the rotation regulating means is formed by a plurality of springs for connecting the rotary member and the passive member to each other.

15. The friction resistance generator according to claim 1, wherein each of the rollers is provided so as to be movable in the opposed direction of the rotary member and the passive member, and urging means for urging the roller against the rotary member side or the passive member side is provided.

16. The friction resistance generator according to claim 1, wherein each roller is provided so that the angle of the rotation axis thereof id adjustable arbitrarily.

17. The friction resistance generator according to claim 1, wherein a generator driven by the rotation of the roller is provided.

* * * * *